United States Patent
Chelin et al.

(10) Patent No.: US 12,247,528 B2
(45) Date of Patent: Mar. 11, 2025

(54) DEFLECTOR PROVIDED WITH A SPOILER FOR A THRUST REVERSER OF AN AIRCRAFT ENGINE NACELLE

(71) Applicant: Airbus Operations SAS, Toulouse (FR)

(72) Inventors: Frédéric Chelin, Toulouse (FR); Christophe Bourdeau, Toulouse (FR); Romain Cusset, Toulouse (FR); Lauren Davis, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 18/303,076

(22) Filed: Apr. 19, 2023

(65) Prior Publication Data
US 2023/0340929 A1    Oct. 26, 2023

(30) Foreign Application Priority Data

Apr. 21, 2022  (FR) ........................................ 2203681

(51) Int. Cl.
*F02K 1/72* (2006.01)
*F02K 1/76* (2006.01)

(52) U.S. Cl.
CPC .............. *F02K 1/72* (2013.01); *F02K 1/766* (2013.01)

(58) Field of Classification Search
CPC ......... F02K 1/70; F02K 1/72; F05D 2240/129
See application file for complete search history.

(56) References Cited

U.S. PATENT DOCUMENTS

| | | | |
|---|---|---|---|
| 2,945,346 A | 7/1960 | Arnzen | |
| 3,717,304 A * | 2/1973 | Sutton | F02K 1/70 239/265.19 |
| 3,875,742 A * | 4/1975 | McMurtry | F02K 1/72 60/229 |
| 4,722,821 A | 2/1988 | Vermilye | |
| 4,894,985 A * | 1/1990 | Dubois | F02K 1/70 239/265.29 |
| 5,040,730 A * | 8/1991 | Hogie | F02K 1/70 60/230 |
| 5,230,213 A * | 7/1993 | Lawson | F02K 1/60 244/110 B |

(Continued)

FOREIGN PATENT DOCUMENTS

EP    3597543 A2    1/2020

OTHER PUBLICATIONS

French Search Report for corresponding French Patent Application No. 2203681 dated Nov. 18, 2022; priority document.

*Primary Examiner* — Andrew H Nguyen
(74) *Attorney, Agent, or Firm* — Greer, Burns & Crain, Ltd.

(57) ABSTRACT

A deflector provided with a spoiler for a thrust reverser of an aircraft engine nacelle. The deflector, a lateral deflector or an orbital deflector, may be in an exhaust structure of a thrust reverser and comprises a deflector plate configured to act on an aerodynamic flow. The deflector plate has a concave upstream face and a convex downstream face, as well as an intake end and an exhaust end. The deflector is fitted with a spoiler rigidly connected to the exhaust end of the deflector plate and arranged transversely in relation to the deflector plate. The spoiler endowing the deflector with specific properties to act on the aerodynamic flow.

12 Claims, 7 Drawing Sheets

(56) References Cited

U.S. PATENT DOCUMENTS

| | | | | |
|---|---|---|---|---|
| 6,293,495 | B1* | 9/2001 | Aten | F02K 1/70 |
| | | | | 244/110 B |
| 2002/0124550 | A1* | 9/2002 | Stretton | F02K 1/72 |
| | | | | 60/226.2 |
| 2009/0314887 | A1 | 12/2009 | Aten et al. | |
| 2015/0113944 | A1* | 4/2015 | Pascal | B64D 33/04 |
| | | | | 239/265.19 |
| 2015/0285184 | A1* | 10/2015 | Sawyers-Abbott | F02K 1/72 |
| | | | | 29/889.22 |
| 2017/0058828 | A1* | 3/2017 | Dong | F02K 1/625 |
| 2019/0032601 | A1* | 1/2019 | Harpal | F02K 1/763 |
| 2020/0200124 | A1* | 6/2020 | Chilukuri | F02K 1/766 |
| 2022/0252021 | A1* | 8/2022 | Jodet | F02K 1/72 |
| 2023/0106521 | A1* | 4/2023 | Gormley | F02K 1/72 |
| | | | | 239/265.33 |

* cited by examiner

DEFLECTOR PROVIDED WITH A SPOILER FOR A THRUST REVERSER OF AN AIRCRAFT ENGINE NACELLE

CROSS-REFERENCES TO RELATED APPLICATIONS

This application claims the benefit of French Patent Application Number 2203681 filed on Apr. 21, 2022, the entire disclosure of which is incorporated herein by way of reference.

FIELD OF INVENTION

The present invention relates to a deflector provided with a spoiler for a thrust reverser of a nacelle of an aircraft engine, as well as to a thrust reverser comprising at least one such deflector.

BACKGROUND OF INVENTION

It is known that the engines of an aircraft, for example a cargo plane, are provided with a thrust reverser designed to brake the aircraft when landing, by generating a counter-thrust. The thrust reverser is built into the nacelle surrounding the engine, for example a dual-flow turbo-jet engine.

Typically, a cascade thrust reverser has a cover that can be moved alternately between a deployed position opening a passageway in the nacelle and uncovering flow diversion and exhaust cascades, and a closed position closing this passageway.

When the thrust reverser is deployed and the cover is moved to the deployed position, the air flow from the engine is blocked using ports to divert a portion of the flow towards the exhaust cascades and then towards the outside of the nacelle through the aforementioned exhaust cascades, which generates an aerodynamic counterthrust.

The exhaust cascades usually comprise a large number of deflectors.

It would be desirable to improve flow management and to improve the performance of this kind of thrust reverser.

SUMMARY OF THE INVENTION

The present invention relates to a deflector for a thrust reverser of a nacelle of an aircraft engine designed to address these concerns, said deflector comprising a deflector plate intended to act on an aerodynamic flow, said deflector plate having a concave face referred to as the upstream face and a convex face referred to as the downstream face, as well as an intake end and an exhaust end.

According to the invention, said deflector is fitted with a spoiler rigidly connected to the exhaust end of the deflector plate and arranged transversely in relation to the deflector plate.

The arrangement of the spoiler therefore endows the deflector with specific properties to act on the aerodynamic flow, in particular helping to enhance the performance of a thrust reverser incorporating such a deflector, as specified below.

According to the present invention, said deflector may be:
an orbital deflector, or
a lateral deflector.

Advantageously, the spoiler is a plate arranged such as to form an angle with a direction orthogonal to a vertical direction, said angle being within a range of values of between +φ1 and −φ2, φ1 and φ2 being non-zero angular values.

Furthermore and advantageously, the width of the spoiler is equal to or less than half the height of the deflector plate.

Furthermore, in a first embodiment, the width of the spoiler is constant in the longitudinal direction and, in a second embodiment, the width of the spoiler is variable in the longitudinal direction.

Furthermore, in a first embodiment, the deflector plate and the spoiler are of constant thickness.

Furthermore, in a second embodiment, the deflector plate is of variable thickness. Preferably, in this second embodiment, the body of the deflector plate contains a hollow closed internal space.

Furthermore and advantageously, the deflector plate has, at the intake end, an intake angle of between 5° and 70° for the upstream face and for the downstream face and, at the exhaust end, an exhaust angle of between 10° and 60° for the downstream face.

The present invention also relates to a thrust reverser for a nacelle of an aircraft engine. According to the invention, said thrust reverser comprises at least one deflector as described above.

Advantageously, the deflector or deflectors are arranged to create exhaust paths of variable widths.

Furthermore, the thrust reverser advantageously comprises a plurality of deflectors having variable features, for example height, depending on the location thereof.

Furthermore, the thrust reverser advantageously comprises a plurality of deflectors, at least two of which are radially offset from each other.

The present invention also relates to a nacelle for an engine of an aircraft, in particular a cargo plane, comprising at least one thrust reverser as described above.

BRIEF DESCRIPTION OF THE DRAWINGS

The attached figures help to understand how the invention can be carried out. In these figures, identical reference signs refer to similar elements.

DETAILED DESCRIPTION OF THE PREFERRED EMBODIMENTS

Figure 1:
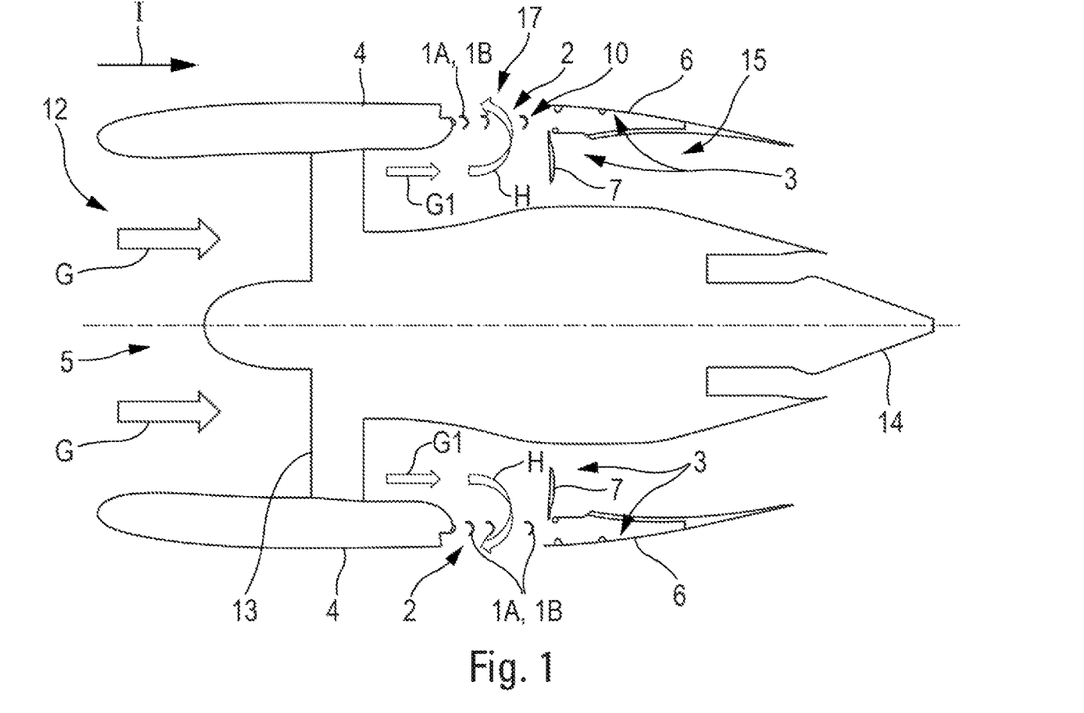
FIG. 1 is a schematic cross-section view of an aircraft engine nacelle, provided with a thrust reverser comprising deflectors according to one specific embodiment of the invention.
Figure 2:
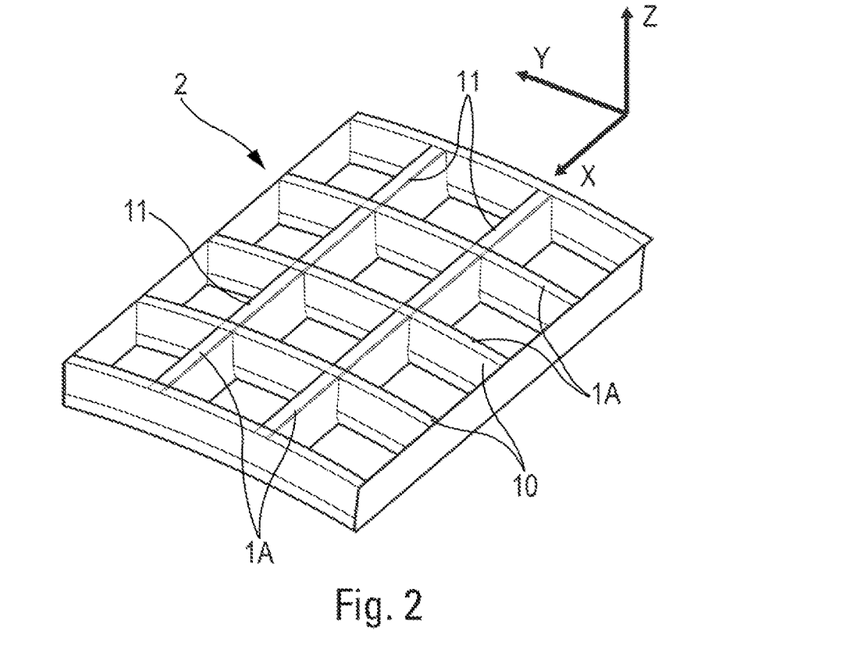
FIG. 2 is a perspective view of a portion of an exhaust structure provided with lateral and orbital deflectors.
Figures 3, 4:
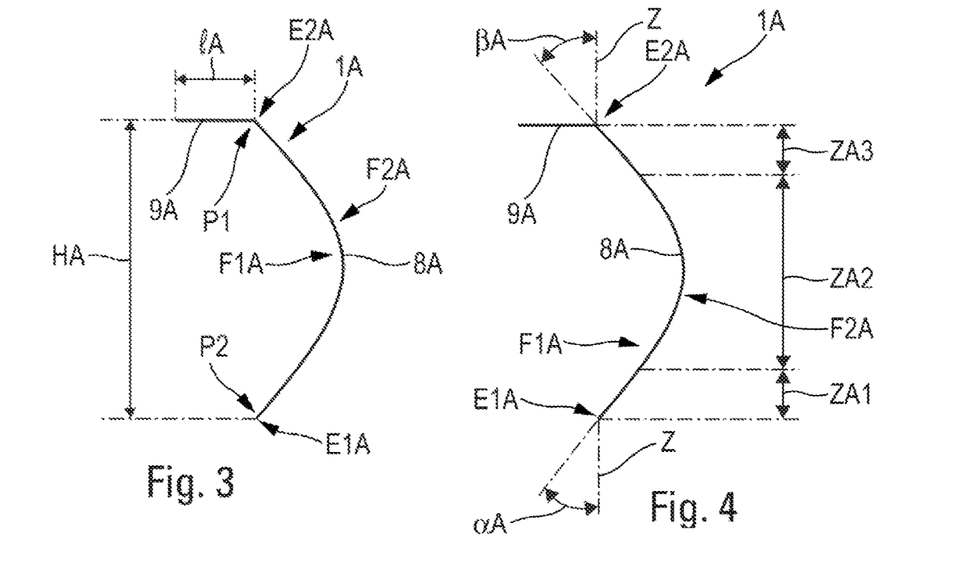
FIG. 3 is a schematic representation of a deflector according to a first embodiment of the invention.
FIG. 4 is a view similar to FIG. 3, highlighting different parameters of the deflector.
Figure 5:
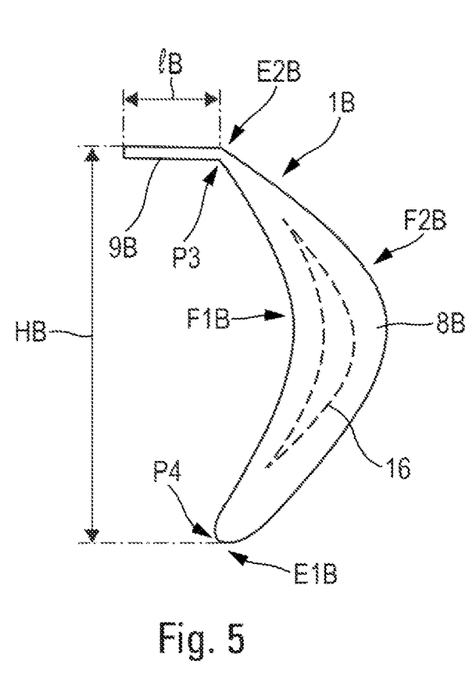
FIG. 5 is a schematic representation of a deflector according to a second embodiment of the invention.
Figure 6:
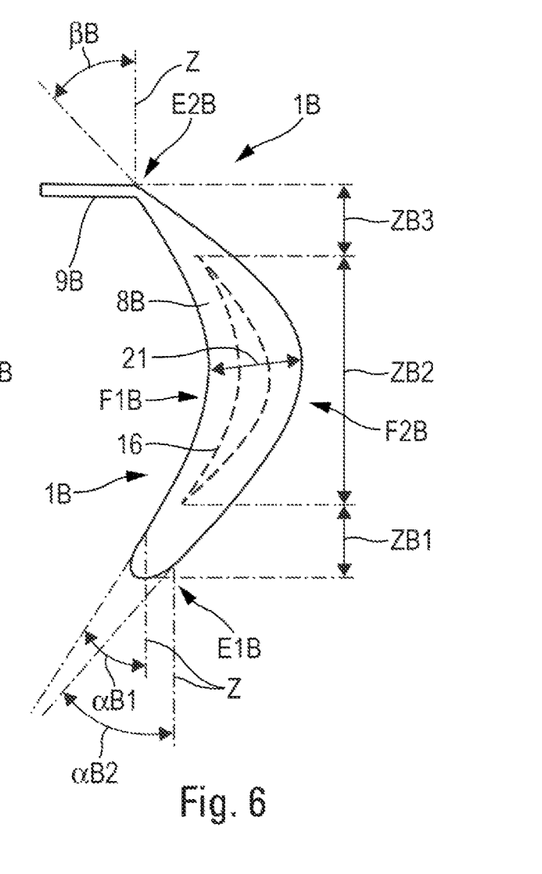
FIG. 6 is a view similar to FIG. 5, highlighting different parameters of the deflector.

The deflector shown schematically in a first embodiment 1A in FIGS. 3 and 4 and in a second embodiment 1B in FIGS. 5 and 6 is intended to be mounted in an exhaust (and flow diversion) structure 2, shown partially in a specific example in FIG. 2. This exhaust structure 2 is part of a thrust reverser 3, as shown in FIG. 1. The thrust reverser 3 is built into the nacelle 4 of an engine 5, for example a dual-flow turbo-jet engine of an aircraft (not shown).

A dual-flow turbo-jet engine is typically able to use a fan 13 to generate a hot air flow from the combustion chamber of the engine and a cold air flow that flows outside the engine through an annular channel 15 formed between a fairing of the turbo-jet engine and an internal wall of the nacelle 4. The two air flows are exhausted from the turbo-jet engine through the rear of the nacelle 4.

In the example shown in FIG. 1, the engine 5, in this case a dual-flow turbo-jet engine, is conventionally surrounded by the nacelle 4. The nacelle 4 has a tubular structure comprising, successively in the direction of an arrow I (from front to back) in FIG. 1, an air intake 12 through which an air flow enters, as illustrated by the arrows G, a section intended to surround the fan 13 of the turbo-jet engine, and a section housing the thrust reverser 3 and intended to surround the combustion chamber of the turbo-jet engine, and ending in an exhaust nozzle 14.

The function of the thrust reverser 3 is to improve braking capacity, when landing an aircraft equipped with the nacelle 4 and the engine 5, by redirecting at least a portion of the thrust generated by the engine 5 forwards (in the direction opposite the arrow I).

To do so, the nacelle 4 for example has a mobile cover 6 that can be slid backwards (in the direction of arrow I) during an opening phase to uncover the exhaust structure or structures 2 arranged in the thickness of the nacelle 4 in an exhaust zone 17. A mechanical system connects this mobile cover 6 and blocking panels (or ports) 7 that are deployed inside the duct 15 and block the egress of the flow G1 (corresponding to the portion of the flow G flowing through the duct 15) flowing directly through the rear. The flow is then diverted and exhausted through the exhaust structure 2, as illustrated by the arrows H in FIG. 1, thereby generating the reverse thrust.

FIG. 2 shows a portion of the exhaust structure 2, by way of example. This exhaust structure 2 has a plurality of deflectors 10 and 11, specifically:

orbital deflectors 10, i.e. deflectors that are arranged in a direction (illustrated by an arrow Y) normal to the direction of the engine centerline (illustrated by an arrow X) of the engine 5 and are typically used to divert the air flow to generate the reverse thrust, and lateral deflectors 11, i.e. deflectors that are arranged in the direction of the engine centerline illustrated by the arrow X and that act on the flow coming out of the thrust reverser to prevent said flow from reaching certain areas, as specified below.

According to the present invention, the deflector shown schematically in a first embodiment 1A in FIGS. 3 and 4 and in a second embodiment 1B in FIGS. 5 and 6 may be an orbital deflector 10 or a lateral deflector 11, as specified below.

Regardless of the embodiment considered, the deflector 1A, 1B has a deflector plate 8A, 8B. The deflector plate 8A, 8B and the deflector 1A, 1B can be made according to different embodiments, as specified below.

The deflector plate 8A, 8B has an upstream face F1A, F1B that is concave and a downstream face F2A, F2B that is convex. The upstream face F1A, F1B is located upstream and the downstream face F2A, F2B is located downstream, in relation to the direction of the flow G1.

The deflector plate 8A, 8B also has an intake end E1A, E1B through which the flow H reaches the deflector plate 8A, 8B and an exhaust end E2A, E2B where the flow H leaves the deflector 1A, 1B and the exhaust structure 2.

According to the invention, regardless of the embodiment considered, the deflector 1A, 1B has a spoiler 9A, 9B.

As shown in particular in FIGS. 3 to 6, the spoiler 9A, 9B is rigidly connected to the exhaust end E2A, E2B of the deflector plate 8A, 8B and is arranged transversely in relation to that deflector plate 8A, 8B.

In a preferred embodiment, the spoiler 9A of the deflector 1A is a plate that is arranged substantially orthogonal to a vertical direction (corresponding to the direction Z in FIG. 2, orthogonal to the directions X and Y) passing through the most upstream point P2 (of the intake end E1A) and the most upstream point P1 (of the exhaust end E2A) of the deflector plate 8A, as shown in FIG. 3.

Figure 17:
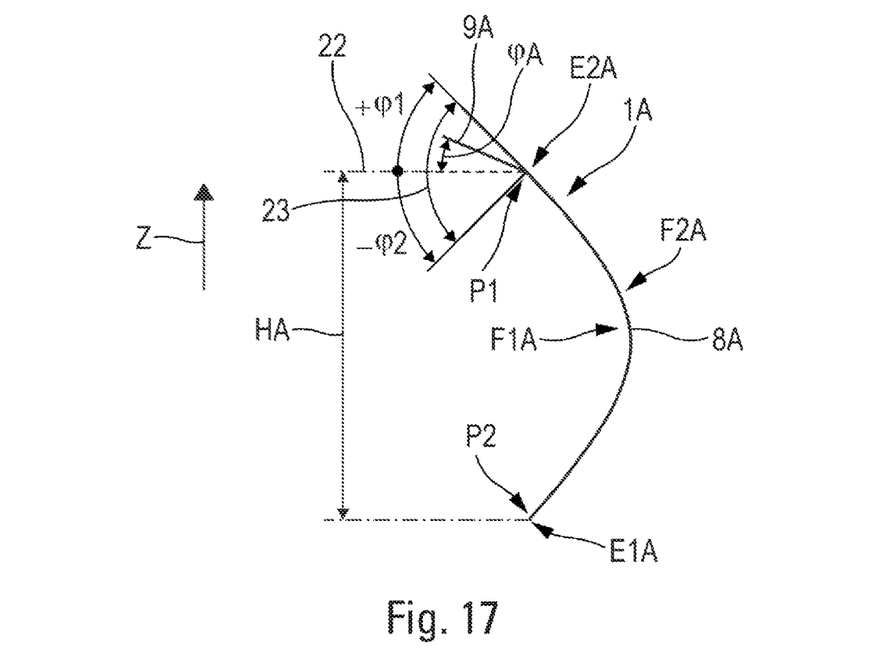
FIG. 17 is a schematic representation of a variant embodiment of the deflector according to the first embodiment of the invention.

More generally and as shown in FIG. 17, the spoiler 9A of the deflector 1A is a plate arranged to form an angle with a direction 22 (corresponding to the direction X or the direction Y in FIG. 2) orthogonal to the vertical direction Z, said angle DA falling within a range of (angular) values 23. This range of values 23 comprises the values +φ1 to −φ2 ("+" being the direction of the arrow Z and "−" being the direction opposite to the arrow Z) with respect to direction 22. φ1 and φ2 are angular values that are equal in the example in FIG. 17. These values may also be different. φ1 and φ2 are non-zero angular values, equal to or less than 60° and preferably equal to or less than 45°.

Similarly, in a preferred embodiment, the spoiler 9B of the deflector 1B is a plate that is arranged substantially orthogonal to the vertical direction (corresponding to the direction Z in FIG. 2) passing through the most upstream point P4 (of the intake end E1B) and the most upstream point P3 (of the exhaust end E2B) of the deflector plate 8B, as shown in FIG. 5.

Figure 18:
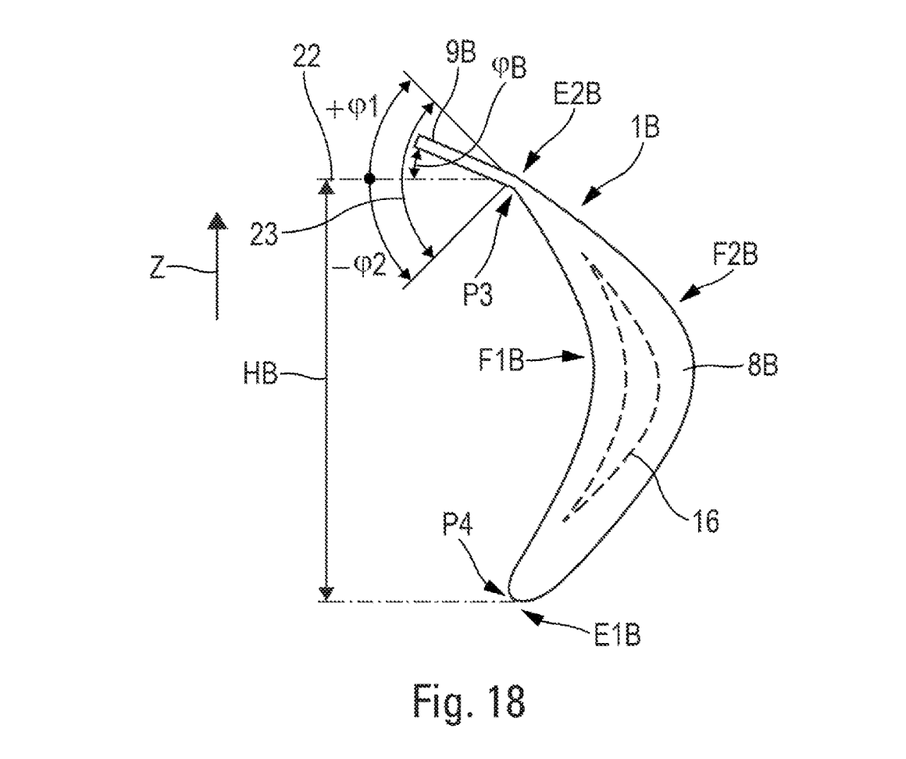
FIG. 18 is a schematic representation of a variant embodiment of the deflector according to the second embodiment of the invention.

More generally and as shown in FIG. 18, the spoiler 9B of the deflector 1B is a plate arranged to form an angle with the direction 22 (corresponding to the direction X or the direction Y in FIG. 2) orthogonal to the vertical direction Z, said angle φB falling within the range of (angular) values 23. This range of values 23 comprises the values +φ1 to −φ2 ("+" being the direction of the arrow Z and "−" being the direction opposite to the arrow Z) with respect to direction 22. φ1 and φ2 are angular values that are equal in the example in FIG. 18. These values may also be different. φ1 and φ2 are non-zero angular values, equal to or less than 60° and preferably equal to or less than 45°.

This spoiler 9A, 9B provided at the exhaust end E2A, E2B generates a very specific aerodynamic effect, modifying the flow topology around the exhaust sections of the thrust reverser 3.

Although the spoiler 9A, 9B can be an attached part fastened (for example by welding) to the deflector plate 8A, 8B, in a preferred embodiment, the deflector 1A, 1B formed by the deflector plate 8A, 8B and the spoiler 9A, 9B is a one-piece part. The deflector 1A, 1B is then easy to make and has good mechanical strength.

According to the present invention, the deflector plate 8A, 8B and the spoiler 9A, 9B can be made according to different embodiments.

In a first embodiment shown in FIGS. 3 and 4 and relating to the deflector 1A, the deflector plate 8A and the spoiler 9A are of constant thickness.

Furthermore, the width CA (FIG. 3) of the spoiler 9A is preferably equal to or less than half the height HA of the deflector plate 8A. The height HA is the length of the deflector plate 8A along the vertical axis Z, i.e. substantially the length between the most upstream point P2 of the intake end E1A and the most upstream point P1 of the exhaust end E2A of the deflector plate 8A.

Furthermore, the deflector plate 8A has three successive zones between the intake end E1A and the exhaust end E2A, as shown in FIG. 4:
an intake zone ZA1 corresponding to a straight section, in cross section,
an intermediate zone ZA2 corresponding to a curved section, in cross section, and
an exhaust zone ZA3 corresponding to a straight section, in cross section.

Furthermore, the deflector plate 8A has an intake angle αA (FIG. 4) of between 5° and 70° at the intake end E1A. This intake angle αA is the angle between the straight section of the intake zone ZA1 and the vertical direction Z.

Furthermore, the deflector plate 8A has an exhaust angle βA (FIG. 4) of between 10° and 60° at the exhaust end E2A. This exhaust angle βA is the angle between the straight section of the exhaust zone ZA3 and the vertical direction Z.

The curved section of the intermediate zone ZA2 can have a variable curvature. This curvature is adapted and optimized to best meet the objectives sought, mainly the effect on flow.

The profile of the deflector 1A can be adjusted by adjusting the height HA and/or said curvature, this being an important parameter for adapting the effect of the deflector 1A on the flow.

The intake angle αA, the exhaust angle βA, and the curvature and length of the intermediate zone ZA2 are variable as a function of the intended embodiments, and the values are chosen in particular to optimize performance. Moreover, the intake angle αA and the exhaust angle βB can have higher values than the conventional deflectors of conventional exhaust cascades, thereby increasing the angular counter-thrust effect.

In a variant embodiment,
the intake zone ZA1 of the deflector plate 8A can be a curved section, in cross section, on the upstream face F1A and/or on the downstream face F2A, and/or
the exhaust zone ZA3 of the deflector plate 8A can be a curved section, in cross section, on the upstream face F1A and/or on the downstream face F2A.

Furthermore, in a second embodiment shown in FIGS. 5 and 6 and relating to the deflector 1B, the deflector plate 8B is of variable thickness.

Preferably, the maximum thickness 21 (FIG. 6) is less than 40% of the height HB of the deflector plate 8B. The height HB is the length of the deflector plate 8B along the vertical axis Z, i.e. substantially the length between the most upstream point P4 of the intake end E1B and the most upstream point P3 of the exhaust end E2B of the deflector plate 8B.

The width CB (FIG. 5) of the spoiler 9B is preferably equal to or less than half the height HB of the deflector plate 8B.

Furthermore, the deflector plate 8B has three successive zones between the intake end E1B and the exhaust end E2B, as shown in FIG. 6:
an intake zone ZB1 corresponding to a straight section, in cross section, on the upstream face F1B and on the downstream face F2B,
an intermediate zone ZB2 corresponding to a curved section, in cross section, with different curvatures between the upstream face F1B and the downstream face F2B, and
an exhaust zone ZB3 corresponding to a straight section, in cross section, at least on the downstream face F2B.

The deflector plate 8B has an intake angle αB1 (FIG. 6) of between 5° and 70° at the intake end E1B on the upstream face F1B. This intake angle αB1 is the angle between the straight section of the intake zone ZB1 on the upstream face F1B and the vertical direction Z.

Furthermore, the deflector plate 8B also has an intake angle αB2 (FIG. 6) of between 5° and 70° at the intake end E1B on the downstream face F2B. This intake angle αB2 is the angle between the straight section of the intake zone ZB1 on the downstream face F2B and the vertical direction Z.

Furthermore, the deflector plate 8B has an exhaust angle βB (FIG. 6) of between 10° and 60° at the exhaust end E2B. This exhaust angle βB is the angle between the straight section of the exhaust zone ZB3 on the downstream face F2B and the vertical direction Z.

The curved sections of the intermediate zone ZB2 can be of variable curvature, both on the upstream face F1A and on the downstream face F2B. These curvatures are adapted and optimized to best meet the objectives sought, mainly the effect on flow.

The profile of the deflector 1B can be adjusted by adjusting the height HB and/or said curvatures, this being a significant parameter for adapting the effect of the deflector 1B on the flow.

The intake angles αB1 and αB2, the exhaust angle βB, and the curvatures and lengths of the intermediate zone ZA2 on the upstream and downstream faces are variable as a function of the intended embodiments, and the values are chosen in particular to optimize performance. Moreover, the intake angles αB1 and αB2 and the exhaust angle βB can have higher values than the conventional deflectors of conventional exhaust cascades, thereby increasing the angular counter-thrust effect.

In a preferred embodiment, the body of the deflector plate 8B according to the second embodiment contains an internal space 16, shown using a dashed line in FIGS. 5 and 6. This internal space 16 is closed and hollow. In cross section, the internal space 16 may, for example, have a (small) shape that is similar to the outer contour of the deflector plate 8B. This preferred embodiment helps to reduce the mass of the deflector 1B.

In a variant embodiment:
the intake zone ZB1 of the deflector plate 8B can be a curved section, in cross section, on the upstream face F1B and/or on the downstream face F2B, and/or
the exhaust zone ZB3 of the deflector plate 8B can be a curved section, in cross section, on the upstream face F1B and/or on the downstream face F2B.

Figure 7:
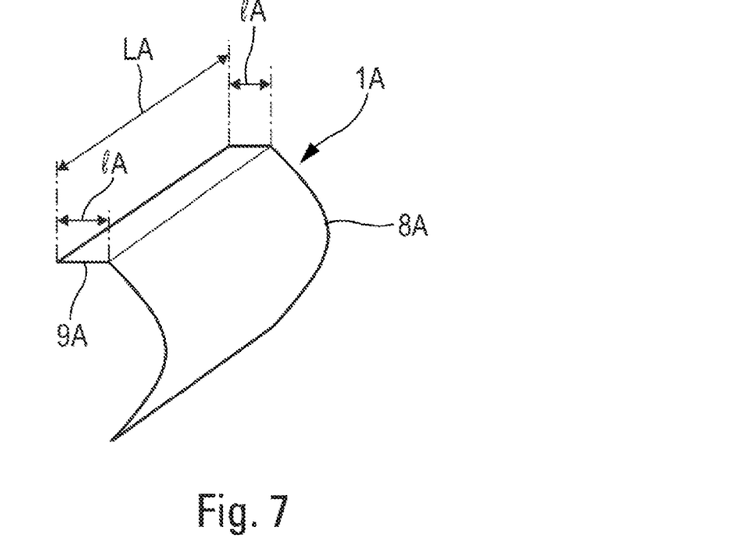
FIG. 7 is a schematic perspective view of a deflector provided with a spoiler of constant width.

Furthermore, in a first embodiment applicable to either of the embodiments 1A and 1B of the deflector, the width CA of the spoiler 9A, 9B is constant along the entire longitudinal direction LA, as shown for spoiler 9A in FIG. 7.

The longitudinal direction LA is parallel to the direction Y shown in FIG. 2.

This embodiment of a spoiler of constant width is shown in FIG. 7 for an example relating to the spoiler 9A. This embodiment can naturally be applied by analogy to the spoiler 9B.

Figure 8:
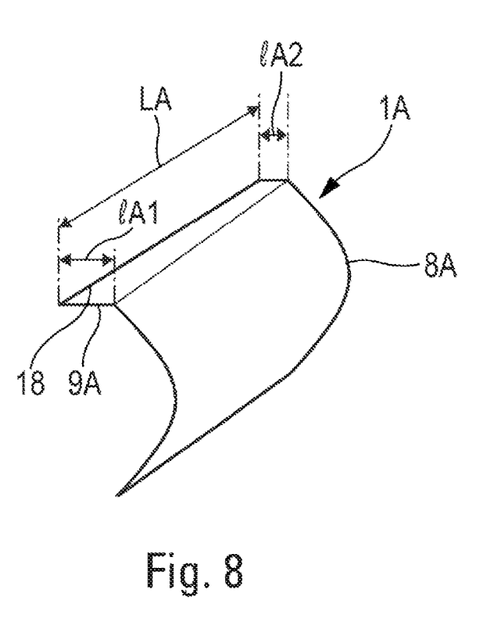
FIG. 8 is a schematic perspective view of a deflector provided with a spoiler of variable width, according to a first embodiment.
Figure 9:
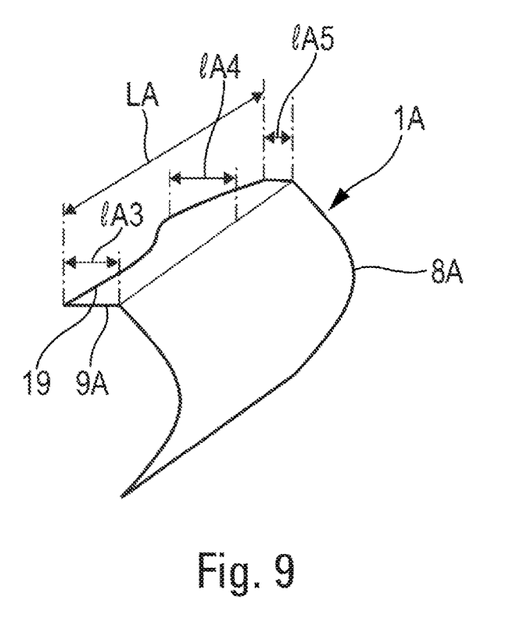
FIG. 9 is a schematic perspective view of a deflector provided with a spoiler of variable width, according to a second embodiment.

Furthermore, regardless of the embodiment 1A or 1B of the deflector, in a second embodiment, the width of the spoiler 9A, 9B is variable along the entire longitudinal direction LA, as shown for spoiler 9A in FIGS. 8 and 9.

In the example in FIG. 8, the width of the spoiler 9A in the longitudinal direction LA is uniformly variable between a width CA1 at one longitudinal end and a width CA2 (smaller than the width CA1) at the other longitudinal end. The upstream edge 18 of the spoiler 9A therefore has a rectilinear shape.

Furthermore, in the example in FIG. 9, the width of the spoiler 9A varies non-uniformly between a width CA3 at one longitudinal end and a width CA5 at the other longitudinal end, with a maximum width 1A4 between the two longitudinal ends. The upstream edge 19 of the spoiler 9A therefore has a curved shape in this example.

This embodiment of a spoiler of variable width is described above with reference to FIGS. 8 and 9, which show the deflector 1A. This embodiment can naturally be applied by analogy to the deflector 1B.

According to the present invention, the deflectors 1A, 1B, as described above, can be used as orbital deflectors 10 and/or as lateral deflectors 11 (FIG. 2). Therefore, depending on the intended application, the exhaust structure 2 may comprise:
deflectors 1A, 1B as orbital deflectors 10 only, the lateral deflectors in this case being conventional deflectors,
deflectors 1A, 1B as lateral deflectors 11 only, the orbital deflectors in this case being conventional deflectors, or
deflectors 1A, 1B as both orbital deflectors 10 and lateral deflectors 11.

Several embodiments of exhaust structures 2 comprising one or more deflectors 1A, 1B, at least as orbital deflectors 10, are described below. The orbital deflectors 10 can be arranged in different ways in the exhaust structure 2.

The different features of the orbital deflectors 10 used in the exhaust structure 2, in particular the number, embodiment, size and arrangement thereof, depend on the desired properties and features for the exhaust structure 2 and consequently for the thrust reverser 3, as specified below with reference to different example embodiments.

The exhaust structure 2 has many fewer orbital deflectors 10, for example between 1 and 6 orbital deflectors 10, than a conventional exhaust cascade has conventional orbital deflectors, which in particular helps to reduce size and mass.

Figure 10:
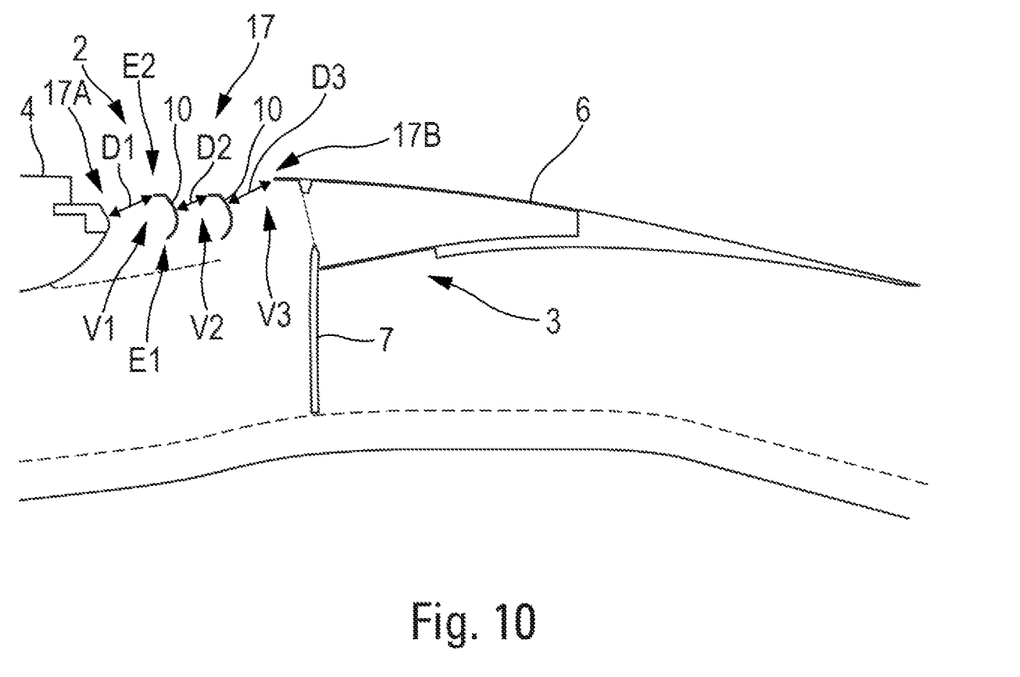
FIG. 10 is a longitudinal schematic cross-section view of a nacelle portion around an exhaust structure, according to a first embodiment.

In a first embodiment, shown in FIG. 10, the exhaust structure 2 comprises two orbital deflectors 10.

These two orbital deflectors 10 are arranged one behind the other, from upstream to downstream, so as to create the exhaust paths V1, V2 and V3. These exhaust paths V1, V2, and V3 have longitudinal distances D1, D2, and D3 at the exhaust end E2 of the exhaust structure 2, specifically:
the distance D1 between the upstream end 17A of the exhaust zone 17 and the most upstream orbital deflector 10,
the distance D2 between the two orbital deflectors 10, and
the distance D3 between the most downstream orbital deflector 10 and the downstream end 17B of the exhaust zone 17.

The distances D1, D2 and D3 are different in this first embodiment and are chosen to optimize the exhaust flow through the exhaust paths V1, V2 and V3 and to obtain the desired properties of the thrust reverser 3, particularly with regard to exhaust.

In a variant embodiment, some or all of the distances D1, D2 and D3 can be equal.

Setting the distances D1 to D3 is an important parameter for modifying the performance of the exhaust structure 2 and therefore of the thrust reverser 3. In particular, since the flow G1 (FIG. 1) approaching the thrust reverser 3 is not uniform, the spacing of the orbital deflectors 10 and therefore the distances D1 to D3 can notably be adjusted to optimize the flow H passing through the exhaust structure 2.

Figure 11:
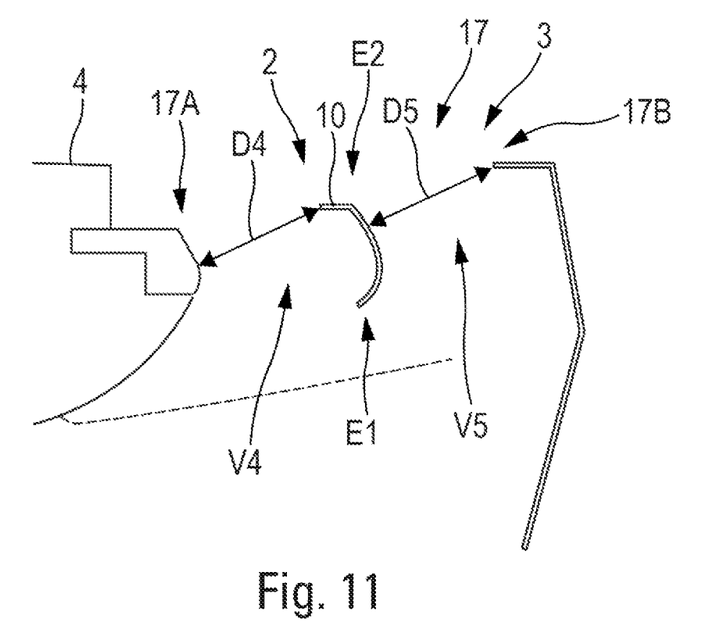
FIG. 11 is a longitudinal schematic cross-section view of a nacelle portion around an exhaust structure, according to a second embodiment.

In a second embodiment, shown in FIG. 11, the exhaust structure 2 comprises a single orbital deflector 10.

This orbital deflector 10 is arranged in the exhaust zone 17 to create two exhaust paths V4 and V5. These two exhaust paths V4 and V5 have longitudinal distances D4 and D5 at the exhaust end E2 of the exhaust structure 2, specifically:
the distance D4 between the upstream end 17A of the exhaust zone 17 and the orbital deflector 10, and
the distance D5 between the orbital deflector 10 and the downstream end 17B of the exhaust zone 17.

The distances D4 and D5 are different and are chosen to optimize the exhaust flow through the exhaust paths V4 and V5 and to obtain the desired properties of the thrust reverser 3, particularly with regard to exhaust. The distance D5 is preferably shorter than the distance D4. In a variant embodiment, the distances D4 and D5 are equal or the distance D5 is longer than the distance D4. The distances D4 and D5 are adjusted as a function of the flow in the exhaust paths V4 and V5.

On account of the features of the deflector 1A, 1B used, a single orbital deflector 10, notably optimized in terms of exhaust section and profile, may be sufficient for operation of the thrust reverser, in particular in the case of an engine 5 with an ultra-high bypass ratio (UHBR), which in particular has lower fan rotation speeds.

Figure 12:
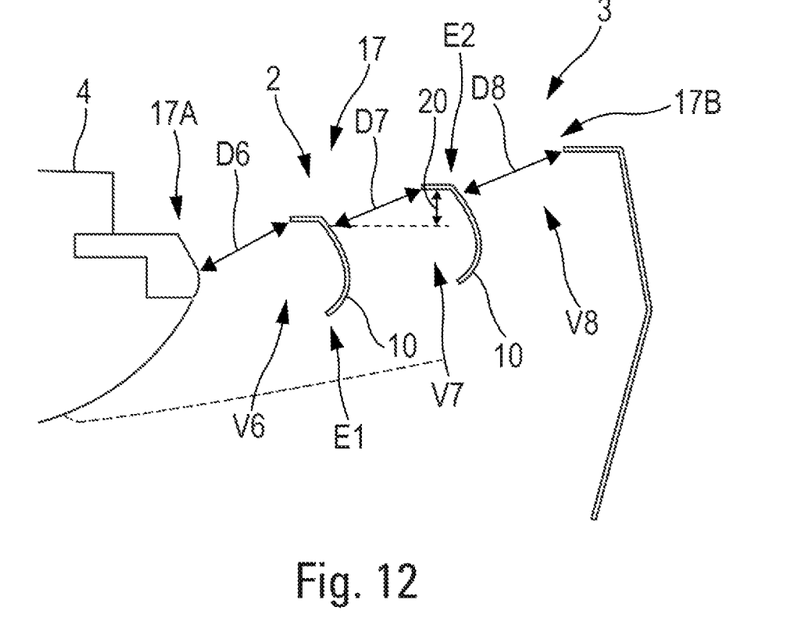
FIG. 12 is a longitudinal schematic cross-section view of a nacelle portion around an exhaust structure, according to a third embodiment.

In a third embodiment, shown in FIG. 12, the exhaust structure 2 comprises two orbital deflectors 10.

These orbital deflectors 10 are arranged one behind the other, from upstream to downstream, to create the exhaust paths V6, V7 and V8. These exhaust paths V6, V7, and V8 have longitudinal distances D6, D7, and D8 at the exhaust end E2 of the exhaust structure 2, specifically:

the distance D6 between the upstream end 17A of the exhaust zone 17 and the most upstream orbital deflector 10, the distance D7 between the two orbital deflectors 10, and the distance D8 between the most downstream orbital deflector 10 and the downstream end 17B of the exhaust zone 17.

The distances D6, D7 and D8 are different in this embodiment and are chosen to optimize the exhaust flow through the exhaust paths V6, V7 and V8 and to obtain the desired properties of the thrust reverser 3, particularly with regard to exhaust. In a variant embodiment, some or all of the distances D6, D7 and D8 can be equal.

Furthermore, in this third embodiment, and unlike the first and second embodiments described above, the orbital deflectors 10 are not aligned. Indeed, the two identical orbital deflectors 10 are radially offset from each other. Specifically, the most downstream orbital deflector 10 is offset radially outward by a radial distance 20, relative to the most upstream orbital deflector 10. This radial offsetting in particular helps to achieve the specific flow characteristics sought for the exhaust structure 2.

Figure 13:
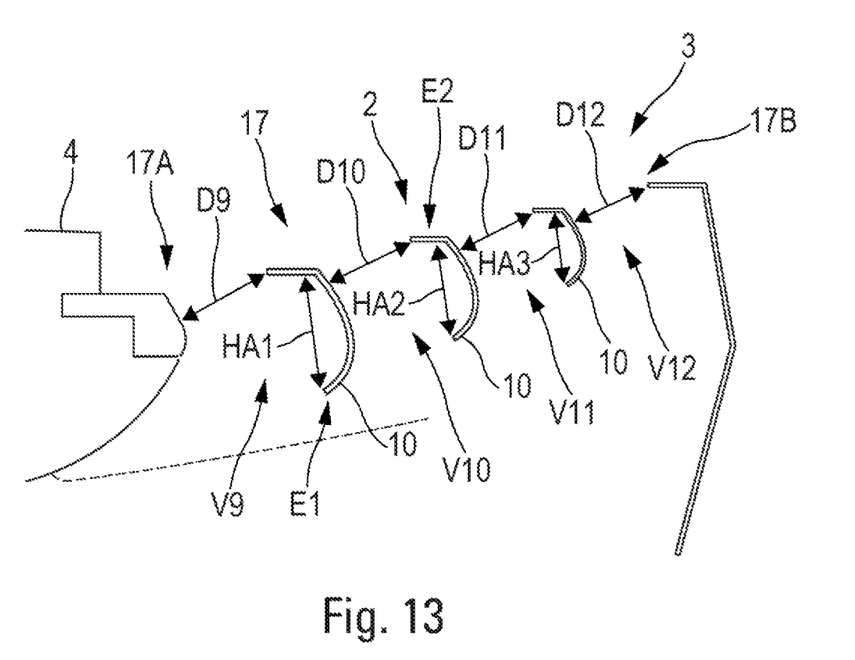
FIG. 13 is a longitudinal schematic cross-section view of a nacelle portion around an exhaust structure, according to a fourth embodiment.

Furthermore, in a fourth embodiment, shown in FIG. 13, the exhaust structure 2 comprises three orbital deflectors 10.

These orbital deflectors 10 are arranged one behind the other, from upstream to downstream, to create the exhaust paths V9, V10, V11 and V12. These exhaust paths V9, V10, V11 and V12 have longitudinal distances D9, D10, D11 and D12 at the exhaust end E2 of the exhaust structure 2, specifically:

the distance D9 between the upstream end 17A of the exhaust zone 17 and the most upstream orbital deflector 10, the distance D10 between the two most upstream orbital deflectors 10, the distance D11 between the two most downstream orbital deflectors 10, and the distance D12 between the most downstream orbital deflector 10 and the downstream end 17B of the exhaust zone 17.

The distances D9, D10, D11 and D12 are different in this embodiment and are chosen to optimize the exhaust flow through the exhaust paths V10, V11 and V12 and to obtain the desired properties of the thrust reverser 3, particularly with regard to exhaust. In a variant embodiment, some or all of the distances D9, D10, D11 and D12 can be equal.

In this fourth embodiment, the orbital deflectors 10 are not aligned. Indeed, the orbital deflectors 10 are radially offset from each other. More specifically, from upstream to downstream, the successive orbital deflectors 10 are offset radially outward. This radial offsetting in particular helps to achieve the specific flow characteristics sought for the exhaust structure 2.

Furthermore, in this fourth embodiment, and unlike the first, second and third embodiments described above, the orbital deflectors 10 are not identical. Indeed, the respective heights HA1, HA2, and HA3 of the three orbital deflectors 10 are different. In a variant embodiment, there may be other differences between the orbital deflectors 10, in addition to or instead of the height difference. These differences may, for example, relate to the shapes and dimensions of the spoilers and/or the geometry of the deflector plates of the orbital deflectors. The differences between the orbital deflectors 10 in particular help to achieve the specific flow characteristics sought for the exhaust structure 2.

Figure 14:
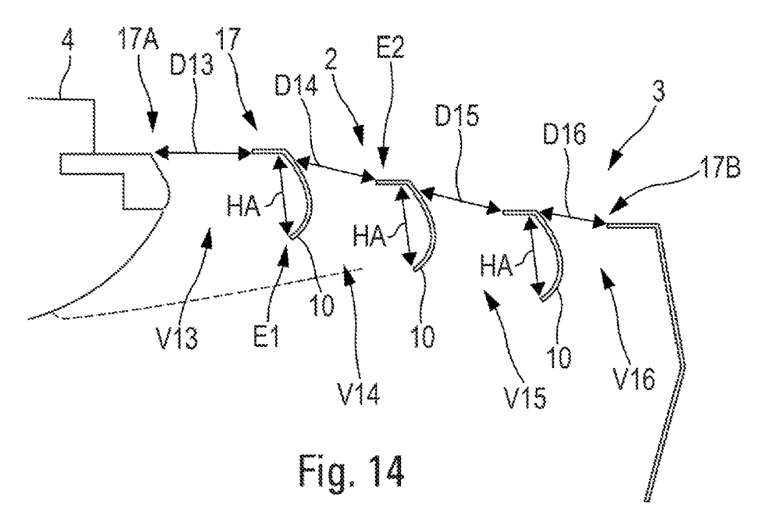
FIG. 14 is a longitudinal schematic cross-section view of a nacelle portion around an exhaust structure, according to a fifth embodiment.

Furthermore, in a fifth embodiment, shown in FIG. 14, the exhaust structure 2 comprises three identical orbital deflectors 10 (of height HA). In a variant, at least some of the orbital deflectors 10 may also be different.

These orbital deflectors 10 are arranged one behind the other, from upstream to downstream, to create the exhaust paths V13, V14, V15 and V16. These exhaust paths V13, V14, V15 and V16 have longitudinal distances D13, D14, D15 and D16 at the exhaust end E2 of the exhaust structure 2, specifically:

the distance D13 between the upstream end 17A of the exhaust zone 17 and the most upstream orbital deflector 10, the distance D14 between the two most upstream orbital deflectors 10, the distance D15 between the two most downstream orbital deflectors 10, and the distance D16 between the most downstream orbital deflector 10 and the downstream end 17B of the exhaust zone 17.

The distances D13, D14, D15 and D16 are different in this embodiment and are chosen to optimize the exhaust flow through the exhaust paths V13, V14, V15 and V16 and to obtain the desired properties of the thrust reverser 3, particularly with regard to exhaust. In a variant embodiment, some or all of the distances D13, D14, D15 and D16 can be equal.

In this fifth embodiment, the orbital deflectors 10 are not aligned. Indeed, the orbital deflectors 10 are radially offset from each other. More specifically, from upstream to downstream, the successive orbital deflectors 10 are offset radially inward, and therefore in the opposite direction to the embodiment in FIG. 13. This radial offsetting in particular helps to achieve the specific flow characteristics sought for the exhaust structure 2.

Figure 15:
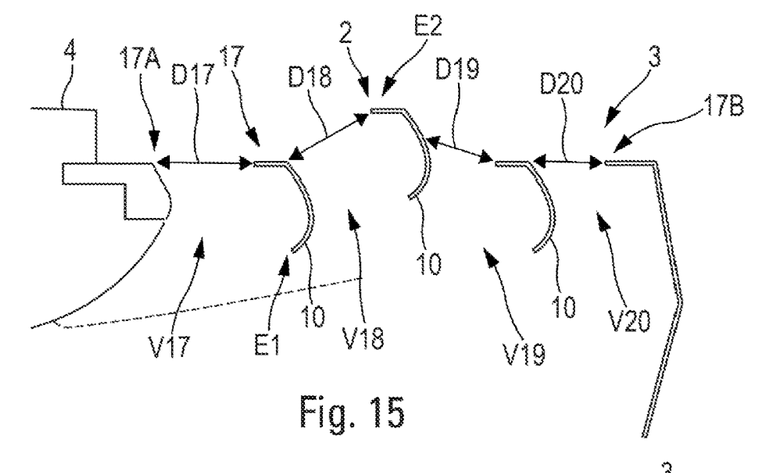
FIG. 15 is a longitudinal schematic cross-section view of a nacelle portion around an exhaust structure, according to a sixth embodiment.
Figure 16:
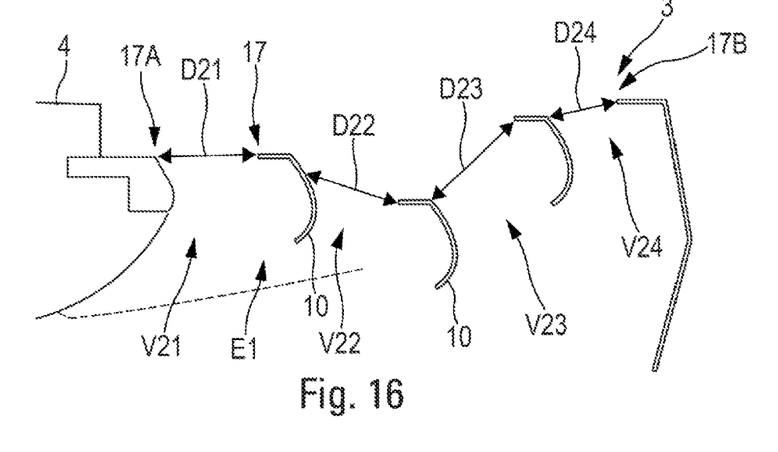
FIG. 16 is a longitudinal schematic cross-section view of a nacelle portion around an exhaust structure, according to a seventh embodiment.

The sixth and seventh embodiments in FIGS. 15 and 16 show further examples of radial offsetting of the orbital deflectors 10 in relation to one other. This radial offsetting helps to achieve the specific flow characteristics sought for the exhaust structure 2.

In these sixth and seventh embodiments, the orbital deflectors 10 are identical. In a variant, at least some of the orbital deflectors 10 may also be different.

In the sixth embodiment in FIG. 15, the orbital deflectors 10 are arranged one behind the other, from upstream to downstream, to create the exhaust paths V17, V18, V18 and V20. These exhaust paths V17, V18, V18 and V20 have longitudinal distances D17, D18, D19 and D20 at the exhaust end E2 of the exhaust structure 2, specifically:

the distance D17 between the upstream end 17A of the exhaust zone 17 and the most upstream orbital deflector 10, the distance D18 between the two most upstream orbital deflectors 10, the distance D19 between the two most downstream orbital deflectors 10, and the distance D20 between the most downstream orbital deflector 10 and the downstream end 17B of the exhaust zone 17.

The distances D17, D18, D19 and D20 are different in this embodiment and are chosen to optimize the exhaust flow through the exhaust paths V17, V18, V18 and V20 and to obtain the desired properties of the thrust reverser 3, particularly with regard to exhaust. In a variant embodiment, some or all of the distances D17, D18, D19 and D20 can be equal.

In this sixth embodiment, the orbital deflectors 10 are not all aligned. Indeed, some of the orbital deflectors 10 are radially offset from each other. More specifically, the two end orbital deflectors 10 (i.e. the most upstream orbital deflector 10 and the most downstream orbital deflector 10) are aligned radially, while the center orbital deflector 10 is offset radially outwards from these two end orbital deflectors 10.

Furthermore, in the seventh embodiment in FIG. 16, the orbital deflectors 10 are arranged one behind the other, from upstream to downstream, to create the exhaust paths V21, V22, V23 and V24. These exhaust paths V21, V22, V23 and V24 have longitudinal distances D21, D22, D23 and D24 at the exhaust end E2 of the exhaust structure 2, specifically:

the distance D21 between the upstream end 17A of the exhaust zone 17 and the most upstream orbital deflector 10, the distance D22 between the two most upstream orbital deflectors 10, the distance D23 between the two most downstream orbital deflectors 10, and the distance D24 between the most downstream orbital deflector 10 and the downstream end 17B of the exhaust zone 17.

The distances D21, D22, D23 and D24 are different in this embodiment and are chosen to optimize the exhaust flow through the exhaust paths V21, V22, V23 and V24 and to obtain the desired properties of the thrust reverser 3, particularly with regard to exhaust. In a variant embodiment, some or all of the distances D21, D22, D23 and D24 can be equal.

In this seventh embodiment, the orbital deflectors 10 are not aligned. Indeed, some of the orbital deflectors 10 are radially offset from each other. More specifically, the central orbital deflector 10 is offset radially inwards in relation to the two other orbital deflectors 10, and the most downstream orbital deflector 10 is offset radially outwards in relation to the two other orbital deflectors 10.

Setting the distances D1 to D24 is therefore an important parameter for optimizing the performance of the exhaust structure 2 and therefore of the thrust reverser 3. In particular, since the flow G1 (FIG. 1) approaching the thrust reverser 3 is not uniform, the spacing of the orbital deflectors 10 is notably adjusted to optimize the flow H (passing through the exhaust structure 2), which generates counterthrust.

According to the present invention, controlling the flow H through the exhaust structure 2 in order to optimize the exhaust structure 2 notably involves adapting the exhaust paths V1 to V24 over the entire length thereof from the intake end E1 to the exhaust end E2, in particular by adjusting the positioning (longitudinal and radial) and the features of the orbital deflectors 10 and possibly of the lateral deflectors 11.

In the examples in FIGS. 10 to 16, the orbital deflectors 10 shown schematically are the same shape as the deflector 1A in FIG. 3. The orbital deflectors 10 may also be the deflector 1B in FIG. 5.

Using the orbital deflectors 10 for the deflectors 1A, 1B according to one of the embodiments of the invention enables the conventional exhaust cascades with a high number of conventional orbital deflectors to be replaced by the exhaust structure 2 with fewer orbital deflectors 10, for example 1 to 6 orbital deflectors 10. The orbital deflectors 10 are intended to perform the same aerodynamic function as conventional exhaust cascades to provide the necessary counterthrust.

The number and shapes of these orbital deflectors 10 ensure compliance with the performance requirements in terms of flow rate (sufficient flow rate to obviate operational problems with the fan) and efficiency (counterthrust). The orbital deflectors 10 can therefore be made to meet the desired performance requirements, notably as a function of need.

In particular, since the flow G1 (FIG. 1) approaching the thrust reverser 3 is not uniform, the number, spacing and features of the orbital deflector or deflectors 10 are notably adjusted to adapt the orbital deflectors to said flow G1 in order to optimize the flow H passing through the exhaust structure 2, thereby increasing the generated counterthrust.

The preceding embodiments, relating to FIGS. 10 to 16, relate to the orbital deflectors 10 of the exhaust structure 2.

As mentioned above, in a specific embodiment, the exhaust structure 2 may also include deflectors 1A, 1B as lateral deflectors 11.

The lateral deflectors 11, preferably fewer than 50, can be made in the same way as the orbital deflectors 10. The lateral deflectors 11 are designed to distribute the air flow at several different angles about the thrust reverser 3. These diversions are in particular intended to prevent discharge towards the ground; re-ingestion of the flow by the air intake, which could damage the engine; and interference with the anemometer.

Regardless of the embodiment, the number of lateral deflectors 11 depends in particular on the desired performance target.

In an embodiment comprising multiple orbital deflectors 10, as in the embodiments in FIGS. 10 and 12 to 16, the lateral deflectors 11 are arranged between the orbital deflectors 10, as in the example in FIG. 2.

Furthermore, in an embodiment with a single orbital deflector 10, as in the embodiment in FIG. 11, the lateral deflectors 11 are fastened internally to the orbital deflector 10.

This obviates the need to provide a support frame surrounding the exhaust structure 2 to hold the deflectors, as in conventional exhaust cascades.

Consequently, the present invention provides for a great deal of flexibility when making the exhaust structure 2. Indeed, one, several or all of the following parameters of the orbital deflectors 10 and/or the lateral deflectors 11 can be adjusted to obtain the desired properties of the exhaust structure 2:

number, individual features, and in particular:

features of the spoilers, such as the width, shape and any features relating to variable width, height, intake and/or exhaust angles, shape of the curvature of the intermediate zone, location in the exhaust structure, i.e. both the longitudinal position (along the axis X) and the radial position (along the axis Z) in the exhaust structure, in particular to determine the features of the exhaust paths, and variations of the aforementioned individual features depending on location in the exhaust structure.

The aforementioned variable parameters have a significant impact on the performance of the thrust reverser 3 and can therefore be chosen to make an exhaust structure 2 and a thrust reverser 3 that are adapted to the engine and to the nacelle incorporating said exhaust structure and said thrust reverser, to achieve the desired properties and performance.

In particular, controlling the flow H using the exhaust structure 2 can involve adapting the exhaust paths V1 to V24 by adjusting the position (longitudinal and radial) and the individual features of the orbital deflectors 10 and possibly of the lateral deflectors 11.

The deflectors 1A, 1B and/or the exhaust structures 2 and/or the thrust reversers 3, as described above, therefore have many advantages.

Firstly, the spoiler 9A, 9B provided at the exhaust end E2A, E2B of the deflector 1A, 1B generates a specific aerodynamic effect, thereby modifying the flow topology around the exhaust sections of the thrust reverser 3. In particular, an angular effect can be generated to increase the counter-thrust effect. Above all, exhaust paths V1 to V24 that act more effectively on the flow can be provided to achieve the desired exhaust features, particularly in terms of performance.

This enables the conventional exhaust cascades (with a high number of conventional orbital deflectors) to be replaced by the exhaust structure 2 with fewer orbital deflectors 10, for example 1 to 6 orbital deflectors 10. The orbital deflectors 10 are intended to perform the same aerodynamic function as conventional exhaust cascades, i.e. to provide the necessary counterthrust.

This also reduces the size and mass of the exhaust structure 2 compared to a conventional exhaust cascade. Furthermore, unlike a conventional exhaust cascade, there is no need to provide a support frame surrounding the exhaust structure 2 to hold the deflectors, which also helps to reduce size and mass.

The number and shapes of the orbital deflectors 10 ensure compliance with the performance requirements in terms of flow rate (sufficient flow rate to obviate operational problems with the fan of the engine) and efficiency (counterthrust). The orbital deflectors 10 can be made to meet the desired performance requirements, notably as a function of need.

The increased efficiency helps to greatly reduce the travel of the thrust reverser 3 and in particular of the mobile cover 6, with a 40% reduction in opening travel being possible for certain embodiments, which represents a significant advantage, in particular in terms of kinematics, actuator length, the dimensional chain, mass, etc.

Furthermore, the deflectors and more generally the exhaust structure can be made of different materials, for example metal, composite material or two materials. Furthermore, the different possible embodiments enable different manufacturing methods to be used, for example a conventional method for manufacturing a composite part or 3D metal printing, and the most suitable method can be used in each case, for example in terms of simplicity, speed and/or manufacturing cost.

Moreover, the varied features that can be obtained for the deflectors 1A, 1B mean that the orbital deflectors 10 and the lateral deflectors 11 can be adapted to generate a controlled flow over the entire engine perimeter, this flow being adapted, for example, to a desired flow map depending notably on the features of the engine and the aerodynamic constraints of the aircraft.

Furthermore, the following parameters are used to optimize operation of the orbital deflectors:
the spacing between the orbital deflectors,
the size of the orbital deflectors,
the staggering (or radial arrangement) of the orbital deflectors,
the geometry of the orbital deflectors, which may be different between the orbital deflectors of the same thrust reverser.

Any combination of these parameters can be implemented in an engine, depending on the features of the engine on which these orbital deflectors are mounted.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A thrust reverser for a nacelle of an aircraft engine, the thrust reverser comprising:
an orbital deflector, the orbital deflector arranged in a direction normal to a direction of an engine centerline of the aircraft; and
a lateral deflector, the lateral deflector arranged in the direction of the engine centerline, and, wherein each of the orbital deflector and the lateral deflector comprises:
a deflector plate configured to act on an aerodynamic flow, said deflector plate having a concave face and a convex face, as well as an intake end and an exhaust end, the deflector plate configured to fit entirely within a thickness of the aircraft engine nacelle during an opening phase of the nacelle wherein a mobile cover of the nacelle is moved backwards in relation to an air intake of the nacelle, and,
a spoiler rigidly connected to the exhaust end of the deflector plate, wherein an angle of the spoiler from a line normal to the centerline of the aircraft engine is greater than an angle of the exhaust end of the deflector plate from the line normal to the centerline of the aircraft engine;
wherein the exhaust end of the deflector plate and the spoiler meet at a deflection point where the spoiler becomes orthogonal to the line normal to the centerline of the engine.

2. The thrust reverser for a nacelle of an aircraft engine as claimed in claim 1, wherein a width of the spoiler is equal to or less than half a height of the deflector plate.

3. The thrust reverser for a nacelle of an aircraft engine as claimed in claim 1, wherein a width of the spoiler is constant in a longitudinal direction thereof.

4. The thrust reverser for a nacelle of an aircraft engine as claimed in claim 1, wherein a width of the spoiler is variable in a longitudinal direction thereof.

5. The thrust reverser for a nacelle of an aircraft engine as claimed in claim 1, wherein the deflector plate and the spoiler are of constant thickness.

6. The thrust reverser for a nacelle of an aircraft engine as claimed in claim 1, wherein the deflector plate is of variable thickness.

7. The thrust reverser for a nacelle of an aircraft engine as claimed in claim 6, wherein the deflector plate comprises a body containing a hollow closed internal space.

8. The thrust reverser for a nacelle of an aircraft engine as claimed in claim 1, wherein the deflector plate has, at the intake end, an intake angle of between 5° and 70° for the upstream face and for the downstream face and, at the exhaust end, an exhaust angle of between 10° and 60° for the downstream face.

9. The thrust reverser as claimed in claim 1, wherein the orbital deflector and the lateral deflector are arranged to create exhaust paths of variable widths.

10. The thrust reverser as claimed in claim 1, wherein the orbital deflector is one of a plurality of orbital deflectors and the lateral deflector is one of a plurality of lateral deflectors, each having variable features depending on a location thereof.

11. The thrust reverser as claimed in claim 1, wherein the orbital deflector is one of a plurality of orbital deflectors, at least two of which are radially offset from each other.

12. A nacelle of an aircraft engine, the nacelle comprising:
at least one of the thrust reverser of claim 1.

* * * * *